(12) United States Patent
Zieg

(10) Patent No.: US 11,730,157 B1
(45) Date of Patent: Aug. 22, 2023

(54) FOLDABLE FISHING ROD SLEEVE

(71) Applicant: David Alan Zieg, Highlands Ranch, CO (US)

(72) Inventor: David Alan Zieg, Highlands Ranch, CO (US)

( * ) Notice: Subject to any disclaimer, the term of this patent is extended or adjusted under 35 U.S.C. 154(b) by 0 days.

(21) Appl. No.: 17/727,593

(22) Filed: Apr. 22, 2022

Related U.S. Application Data

(62) Division of application No. 16/552,178, filed on Aug. 27, 2019, now Pat. No. 11,344,015.

(51) Int. Cl.
*A01K 97/08* (2006.01)
(52) U.S. Cl.
CPC .................... *A01K 97/08* (2013.01)
(58) Field of Classification Search
CPC .............. A01K 97/08; B65D 21/086
USPC ............... 43/21.2, 26; 206/315.11; 220/6; 224/922
See application file for complete search history.

(56) References Cited

U.S. PATENT DOCUMENTS

| | | | | |
|---|---|---|---|---|
| 679,422 A * | 7/1901 | Heritage | ............... | A01K 97/08 43/26 |
| 764,398 A * | 7/1904 | Upton | ............... | A01K 87/00 43/18.1 R |
| 2,149,087 A * | 2/1939 | Fisher | ............... | A01K 97/08 43/26 |
| D160,520 S * | 10/1950 | Mowat | ............... | D3/260 |
| 2,723,482 A * | 11/1955 | Marten | ............... | A01K 97/08 206/315.11 |
| 2,869,277 A * | 1/1959 | Breithaupt | ............... | A01K 97/08 D22/134 |
| 3,033,259 A * | 5/1962 | Landis, Sr. | ............... | A01K 97/08 206/315.11 |
| 3,131,503 A * | 5/1964 | Gottula | ............... | A01K 97/08 D22/134 |
| 3,360,224 A * | 12/1967 | Baumann | | |
| 3,540,508 A * | 11/1970 | Couch | ............... | F41C 33/06 206/317 |
| 3,674,190 A * | 7/1972 | Wright | ............... | A01K 97/08 294/166 |
| 3,972,144 A * | 8/1976 | Geisler | ............... | A01K 97/08 206/315.11 |
| D254,696 S * | 4/1980 | Adams | ............... | D3/260 |
| 4,222,193 A * | 9/1980 | Beck | ............... | A01K 97/08 206/315.11 |
| D268,547 S * | 4/1983 | Ruckstuhl | ............... | D3/260 |
| 4,530,178 A * | 7/1985 | Rauscher | ............... | A01K 97/08 43/26 |

(Continued)

*Primary Examiner* — Timothy D Collins
*Assistant Examiner* — Maria E Graber
(74) *Attorney, Agent, or Firm* — Shifrin Patent Law; Dan Shifrin

(57) ABSTRACT

A fishing rod case is provided for holding a rigged fly (or other) fishing rod. The case includes a sleeve, with distal and proximal sections and a flexible middle section, and, optionally, a reel housing on one end of the proximal section. With the reel housing open, a rigged rod may be inserted into the sleeve. The sleeve is bunched in the middle section and the rod grasped through the sleeve on opposite sides of a ferrule of the rod. The two sections of the rod may then be pulled apart at the ferrule and the sleeve folded so that the distal and proximal sections of the sleeve are adjacent and parallel to each other. One or more straps may be used to hold the two sections of the sleeve together.

4 Claims, 5 Drawing Sheets

(56) References Cited

U.S. PATENT DOCUMENTS

| | | | | |
|---|---|---|---|---|
| D294,883 S | * | 3/1988 | McMillin | D3/269 |
| D316,327 S | * | 4/1991 | Craft | D3/260 |
| 5,005,743 A | * | 4/1991 | Ramsay | A63C 11/027 |
| | | | | 224/601 |
| 5,277,306 A | * | 1/1994 | Sargent | A01K 97/08 |
| | | | | 206/315.11 |
| 5,327,669 A | * | 7/1994 | Lannan | A01K 97/08 |
| | | | | 206/315.11 |
| 5,341,590 A | * | 8/1994 | Hepworth | A01K 97/08 |
| | | | | 206/315.11 |
| 5,417,354 A | * | 5/1995 | Jones | A01K 97/08 |
| | | | | 224/613 |
| 5,515,641 A | * | 5/1996 | D'Alessandro | A01K 97/08 |
| | | | | 206/315.11 |
| D382,398 S | * | 8/1997 | Bazen | D3/260 |
| D395,360 S | * | 6/1998 | Schrader, Jr. | D3/260 |
| 5,893,502 A | * | 4/1999 | Redzisz | F41C 33/06 |
| | | | | 224/586 |
| 6,021,597 A | * | 2/2000 | Lajoie | A01K 87/02 |
| | | | | 43/25 |
| 6,318,019 B1 | * | 11/2001 | Harris | A01K 97/06 |
| | | | | 43/26 |
| 6,343,728 B1 | * | 2/2002 | Carbone | A01K 97/08 |
| | | | | 224/680 |
| D459,782 S | * | 7/2002 | Billings | D22/134 |
| 6,668,481 B2 | * | 12/2003 | Garcia | A01K 97/08 |
| | | | | 43/26 |
| D489,176 S | * | 5/2004 | Bazen | A01K 97/08 |
| | | | | D3/260 |
| 6,789,713 B1 | * | 9/2004 | Redzisz | A01K 97/08 |
| | | | | 206/315.11 |
| 6,865,841 B2 | * | 3/2005 | Wieringa | A01K 97/08 |
| | | | | 206/315.11 |
| D537,629 S | * | 3/2007 | Murray | D3/260 |
| 7,434,683 B1 | * | 10/2008 | Harper | A45C 5/00 |
| | | | | 206/315.11 |
| 8,443,579 B2 | * | 5/2013 | Phillips | B65D 85/42 |
| | | | | 53/399 |
| D693,126 S | * | 11/2013 | Drummey | D3/326 |
| 11,484,020 B2 | * | 11/2022 | Mousis | A01K 97/08 |
| D971,600 S | * | 12/2022 | Thompson | D3/260 |
| 2007/0113463 A1 | * | 5/2007 | Duncan | A01K 97/08 |
| | | | | 43/26 |
| 2012/0227309 A1 | * | 9/2012 | Fanelli | A01K 97/08 |
| | | | | 43/26 |
| 2019/0297867 A1 | * | 10/2019 | Yowell | A01K 97/08 |
| 2021/0307309 A1 | * | 10/2021 | Mousis | B65D 85/08 |

\* cited by examiner

FOLDABLE FISHING ROD SLEEVE

RELATED APPLICATION DATA

The present application is a divisional application of, and claims the benefit of, commonly-owned U.S. Pat. No. 11,344,015 entitled A FOLDABLE FISHING ROD CASE, issued on May 31, 2022, which patent is incorporated herein by reference in its entirety.

TECHNICAL FIELD

The present invention relates generally to fishing rods and, in particular, to a fishing rod case.

BACKGROUND

Fishing is an extremely popular recreational activity in the United States due in no small part to the ability of persons of all ages to participate. Over the last ten years or so fly fishing, in particular, has exploded in popularity. Fly fishing involves tying an artificial lure, known as a "fly", typically emulating an insect, onto the end of a monofilament tippet section which is tied to the distal end of a monofilament, tapered leader. The artificial lures used in fly fishing typically have nominal weight, unlike the weighted lures of traditional spin or bait casting techniques. The monofilament leader is then tied or attached to a floating or sinking main line of specific weight and taper. The floating or sinking main line is then used to cast the artificial lure to its designated target, using the inherent weight of the line to bend and load the fly fishing rod during the casting maneuver.

When fly fishermen begin their day of fishing, the process of assembling and rigging the fly rod is one of the first steps they take in preparing to fish. Assembling and rigging the fly rod includes several steps. First, the fly rod sections must be assembled in sequential order, from the thicker section with the handle and reel seat to the thin and fragile tip section, by press-fitting the male end of each section into the female receptacle, known as a ferrule, at the junction of each section. The vast majority of fly rods are manufactured in four separate sections of equal length to allow convenient transport of the un-rigged, disassembled fly rod. Typical fly rod cases for disassembled fly rods are therefore approximately ¼th the length of the assembled fly rod. Assembled fly rods can be anywhere from 6 feet to over 14 feet in length. The most popular length, by far, of an assembled fly rod is 9 feet. The inherent length of a fly rod makes it difficult to store and transport when fully assembled and rigged.

The second step of the rigging process is to attach the reel, which holds the main fishing line, leader and tippet. The reel is attached to the reel seat section of the rod at the proximal end next to the handle by securing the reel foot to the seat, typically by tightening a circular nut over a threaded section of the reel seat. The third step is to thread the fishing line through the numerous metal guides along the full-length of the fly rod until the end of the line reaches through the distal guide at the tip of the fly rod. The next step is to attach the artificial lure to the line at the distal end of the tippet section. Fly fishermen may tie on a single lure or even two or three in a sequential fashion. To secure the lure when not in use, the last step is to take the lure and place the pointed bend of the hook through a small metal loop (hook holder) which is permanently attached to the fishing rod near the handle toward the proximal end. The fly line, leader and tippet are then brought to a taught position by turning the reel to wind in the slack line. The fly line, leader and tippet run the length of the fly rod through the guides then back down the length of the rod outside of the guides to the hook holder when not in use. The process of assembling and rigging a fly rod takes time and effort. Once the fly rod is completely assembled and rigged, it is ready to use.

Fly fishermen often fish one area of a river, lake or pond, and then in the pursuit of fish, will often move to another area to try their luck. This typically involves driving or boating to another area. Transporting a rigged fly rod is challenging due to its long, assembled length. Un-rigging and disassembling a fly rod into its individual sections for convenient transport involves having to re-rig the fly rod once the fly fishermen reaches the new destination, requiring effort and taking time away from pursuing fish. Trying to disassemble the sections for transport without un-rigging the fly rod results in loosening of the line which further results in tangles and wayward lures. This is not common practice because of these issues.

To solve the issue of having to un-rig and disassemble a fly rod for transport and then reassemble and re-rig a fly rod prior to fishing again, there are a variety of suggested solutions, including 10 foot or longer rod cases that can be mounted to the top of a car or truck that house assembled and rigged fly rods. These cases suffer drawbacks. They are themselves cumbersome, expensive and require semi-permanent mounting onto the roof of a motor vehicle. Cases of such length can be unstable on some vehicles and pose a risk of inadvertently coming off of the top of the vehicle as well. Further, they require additional locks to secure the fly rods from theft. Other products also show smaller, ridged cases made of plastic, metal or other material that require the use of multiple hook and loop straps or other devices to secure the line and multiple sections of rod as the fisherman disassembles the fishing rod while rigged. These cases suffer drawbacks as well. They can be complicated and take time and effort to use, so much so that it can be more time consuming than simply disassembling and re-rigging the fly rod. Other solutions provide fly rod and conventional fishing rod cases and sleeves that are designed to transport a rod in an assembled and rigged manner, often noting the advantage of avoiding tangling of line, protection of rod and lures and other advantages, but don't address the issue of the cumbersome length of a rigged fishing rod in transport.

Therefore, a need exists to simply, quickly and conveniently convert a rigged fishing rod into a less cumbersome length for transport that allows for quick re-assembly when the fisherman is ready to fish again.

SUMMARY OF THE INVENTION

Embodiments of the present invention comprise a case and a method that allow a fisherman to take a rigged fishing rod with an attached reel, disassemble the rod at the middle ferrule and fold it in half, resulting in 50% less length. The significantly less cumbersome length of the folded, rigged fishing rod allows fishermen to store and/or transport a rigged fishing rod in a convenient manner in a boat, the backseat or trunk of a sedan, the back of a truck or Sport Utility Vehicle, or on his person. Embodiments of the invention therefore allow the fisherman to avoid having to re-rig the fishing rod when ready to fish again.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention. Referring to the figures, wherein like numerals indicate like or corresponding parts throughout the several views.

References in the specification to "one embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

Directional and relational terms such as, but not limited to, proximal, distal, top, and bottom, are relative to each other and are dependent on the specific orientation of an applicable element or article, and are used accordingly to aid in the description of the various embodiments and are not intended to be construed as limiting.

Figure 1:
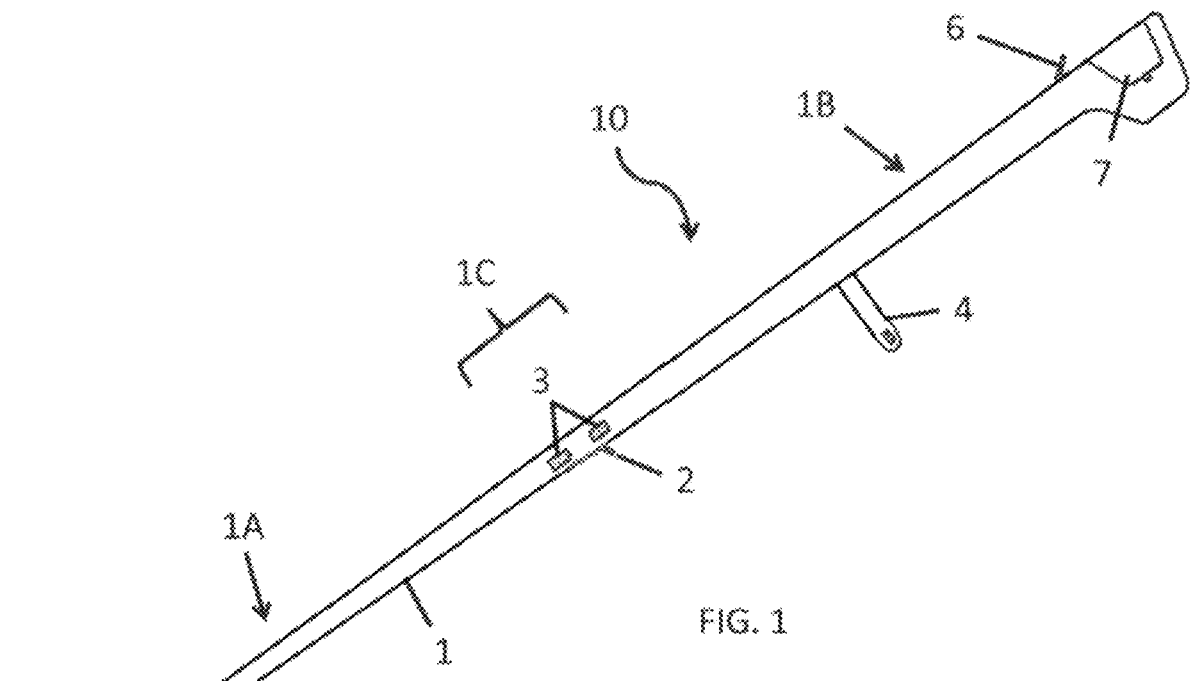
FIG. 1 is a side view of an embodiment of a fishing rod case of the present invention in an unfolded position.
Figure 2:
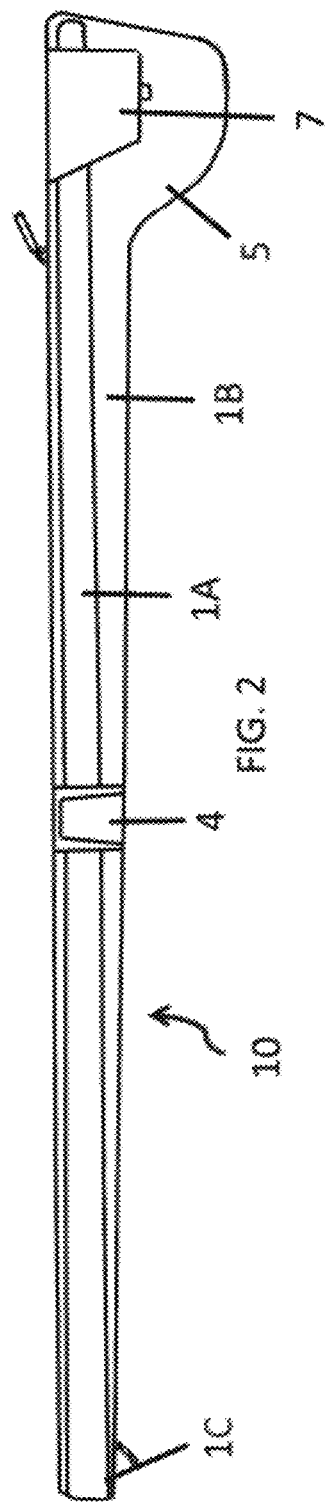
FIG. 2 is a side view of the fishing rod case in the folded position.
Figure 3:
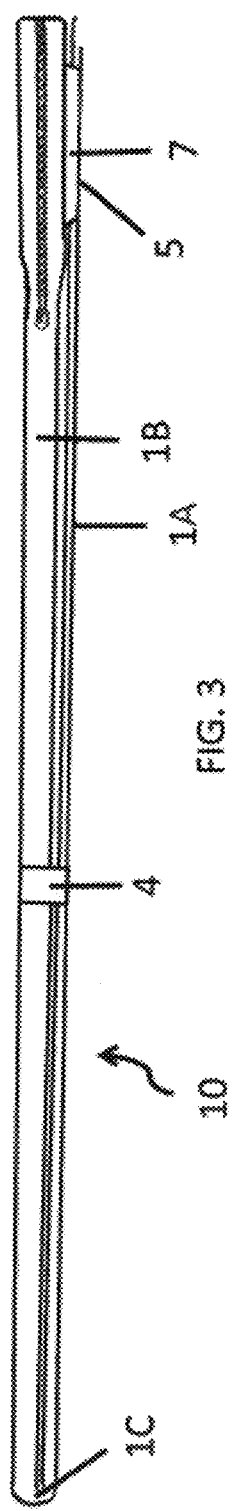
FIG. 3 is a top view of the fishing rod case in the folded position.
Figure 9:
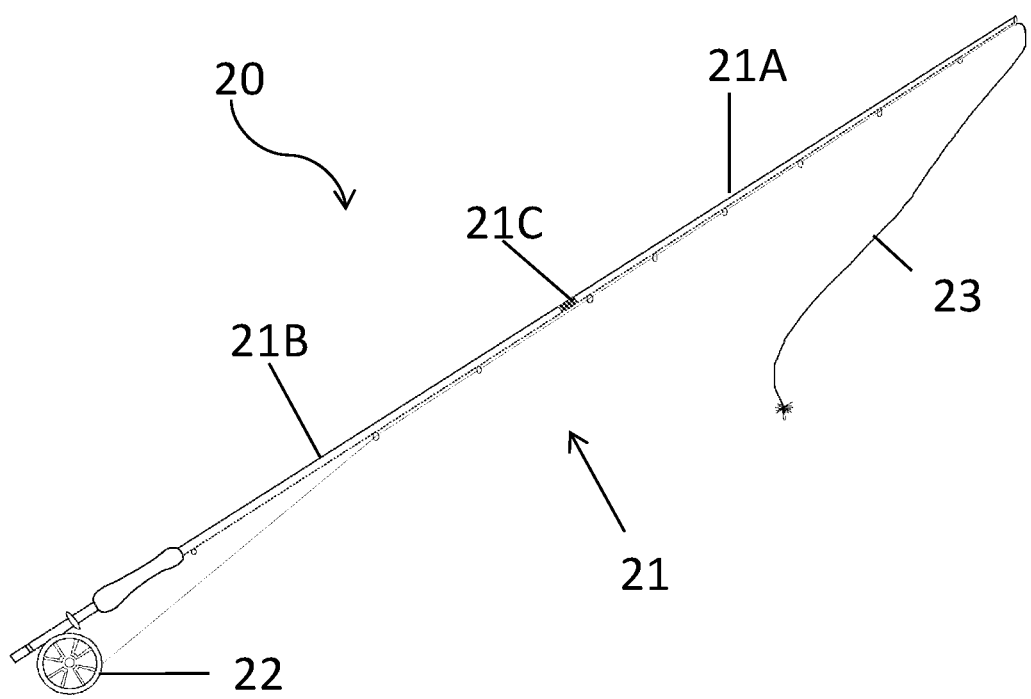
FIG. 9 is a side view of a rigged fly rod insertable into the fishing rod case of FIG. 1.

FIG. 9 is a side view of a rigged fishing rod 20, also referred to as a "rigged fly rod" or "rod," insertable into a foldable fishing rod case 10 of the present invention. The rigged rod 20 includes a rod 21, a reel 22, and fishing line 23. The rod 21 illustrated in the FIG. includes distal and proximal sections 21A, 21B, respectively, joined at a middle ferrule 21C. It will be appreciated that other rods may include more than two sections joined at ferrules. FIG. 1 illustrates an embodiment of the foldable fishing rod case 10 of the present invention in an unfolded position. The case 10 may be comprised of a sleeve 1 having a distal section 1A closed at the end, a middle section 1C, and a proximal section 1B that is open at its end. At least the middle section 1C is flexible or hinges to allow the case 10 to fold. The middle section 1C may include a zipper 2, although hook and loop material, snaps, or any other appropriate closure may be used instead of the zipper 2. Grip material 3 may line the inside of the middle section 1C. A strap or flap 4 may be attached to the sleeve 1, approximately in the middle of the proximal section 1B of the sleeve 1. The flap 4 is used to secure the distal section 1A to the proximal section 1B when the case 1 is in a folded position for transportation or storage (FIGS. 2, 3). It will be appreciated that more than one strap 4 may be used to secure the two sleeve sections 1A, 1B together.

An optional reel housing 5 may be connected to the proximal end of the proximal section 1B, sized and shaped to hold the reel between two sides 5A, 5B. A reel housing zipper 6 allows the reel housing 5 to be opened by separating the sides 5A, 5B. The fly rod 20 may then be slipped into the sleeve 1 and the zipper 6 closed to secure the rigged rod 20 and reel 22 within the case 10. Alternatively, the sides 5A, 5B may be secured with hook and loop material, snaps, or any other appropriate closure. A second flap 7 is attached to one edge of one side of the reel housing 5 and protectively folds over at least a portion of the distal end of the sleeve 1 when the case 10 is folded.

The sleeve 1 may be manufactured in various lengths to accommodate fishing rods of different lengths. In at least one variation, the foldable fishing rod case 10 has a total length of 9 feet 3 inches, which includes the length of the reel housing 5 and sleeve 1. The attached reel 22 does not affect the length of a 9 foot fly fishing rod, a common length fly rod 21. The extra 3 inches of length, relative to the length of the fishing rod 21 allows the fabric of the sleeve 1 to be bundled at the center section 1C overlying the middle ferrule 21C of the fishing rod 21 in order for the fisherman to disengage the middle ferrule 21C of the fishing rod 21 before folding the distal section 1A to be parallel to the proximal section 1B of the sleeve 1 with the enclosed rigged rod 20.

As shown in FIGS. 1 and 2, the diameter of the sleeve 1 may taper from larger to smaller from the reel housing 5 to the distal tip of the sleeve 1, emulating the taper of a fly rod. However, the sleeve 1 may instead have a constant diameter. In at least one embodiment, for example, the diameter is 4 inches at the beginning of the proximal section 1B attached to the reel housing tapering to 2½ inches by the middle section 1C, and maintaining this diameter to the end of the distal section 1A. The relatively narrow diameter of the sleeve 1 beneficially allows the fishing line to remain in close proximity to the rod, keeping the line relatively taught and contained after separation of the center section 1C and folding of the sleeve 1 with the contained rigged fishing rod.

Figure 7:
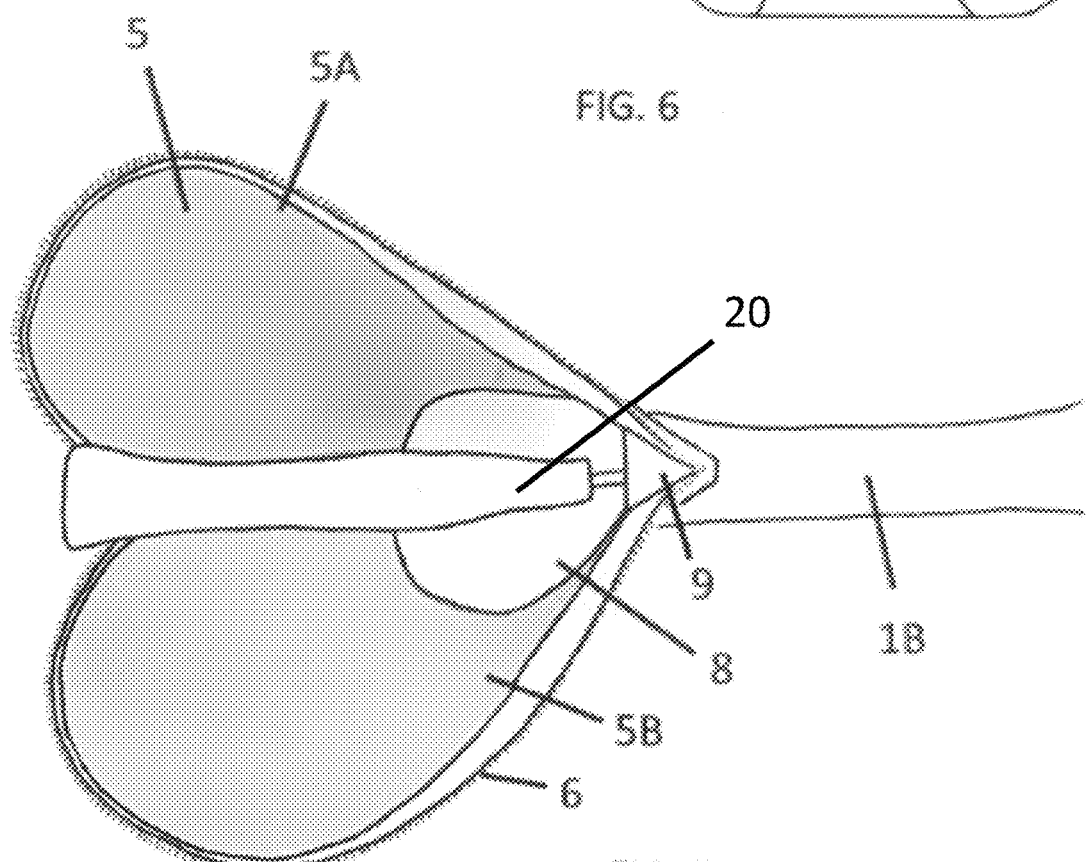
FIG. 7 is an isometric view of the reel housing in the open position.

Referring to FIG. 7, to use the case 10, the fisherman unzips the reel housing zipper 6, opens the reel housing 5 if present, and inserts the full length of the rigged fishing rod 20 into the open end 8 of the proximal section 1B of the sleeve 1. The rigged fishing rod 20 with attached reel 22 is then secured in the device by closing the reel housing 5 and zipping the zipper 6. The sections 21A, 21B of the rod 20 are separated at the middle ferrule 21C and the distal section 1A is folded at the middle section 1C onto the proximal section 1B. When the fisherman is ready to use the rod 20 again, the process is reversed.

The reel housing 5 may be made of any protective material, such as for example, semi-rigid Ethylene-Vinyl Acetate (EVA) foam between fabric outer and inner layers. The sleeve 1 may be made of any appropriate flexible material, such as a nylon fabric that is wear-resistant and able to withstand repeated folding. Alternatively, the sleeve 1 may be made of a rigid or semi-rigid material with the middle section 1C comprising flexible material connecting the distal and proximal sections 1A, 1B.

Figure 4:
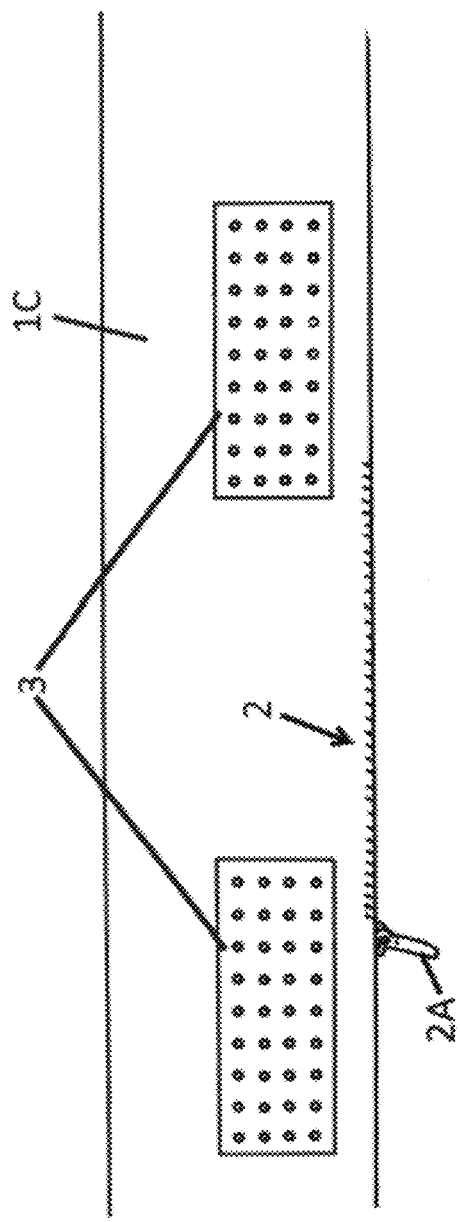
FIG. 4 is a side view of the middle portion of the fishing rod case.

Referring to FIGS. 1 and 4, with the rigged fishing rod 20 and reel 22 secured within the case 10, the fisherman then grasps his hands at the middle section 1C of the sleeve 1. By moving his hands towards each other, the sleeve fabric bunches together at the center. The fisherman then grips the rod 21 through the sleeve 1 on either side of the middle ferrule 21C and pulls the two rod sections 21A, 21B apart. Because the nature of the smooth rod material and fabric results in a low coefficient of friction, it would be difficult to grip the rod 21 firmly and pull the hands away from each other to allow disengagement of the middle ferrule 21C without the fabric sliding over the fishing rod 21. Referring to FIG. 4, a grip material 3, consisting of a layer of a slip-resistant material such as silicone rubber, is applied to the inside of the sleeve fabric on either side of the middle of the sleeve 1. The grip material effectively increases the coefficient of friction between the sleeve 1 and the rod 21, improving the ability of the fisherman to grip the rod 21 and effectively disengage the middle ferrule 21C.

In one embodiment, a slot 2, closable with a zipper, snaps, hook and loop material, or other fastener 2A, may be placed in the center section 1C of the sleeve 1 (FIG. 4). When the zipper 2A is unzipped, the fisherman can see and access the middle ferrule 21C of the fishing rod 21 if needed to improve manipulation of the sections 21A, 21B when engaging and disengaging the rod 21 at the ferrule 21C. This becomes useful when the fisherman has decreased tactile sensitivity or otherwise difficulty feeling and manipulating the rod sections 21A, 21B through the fabric.

Figure 10:
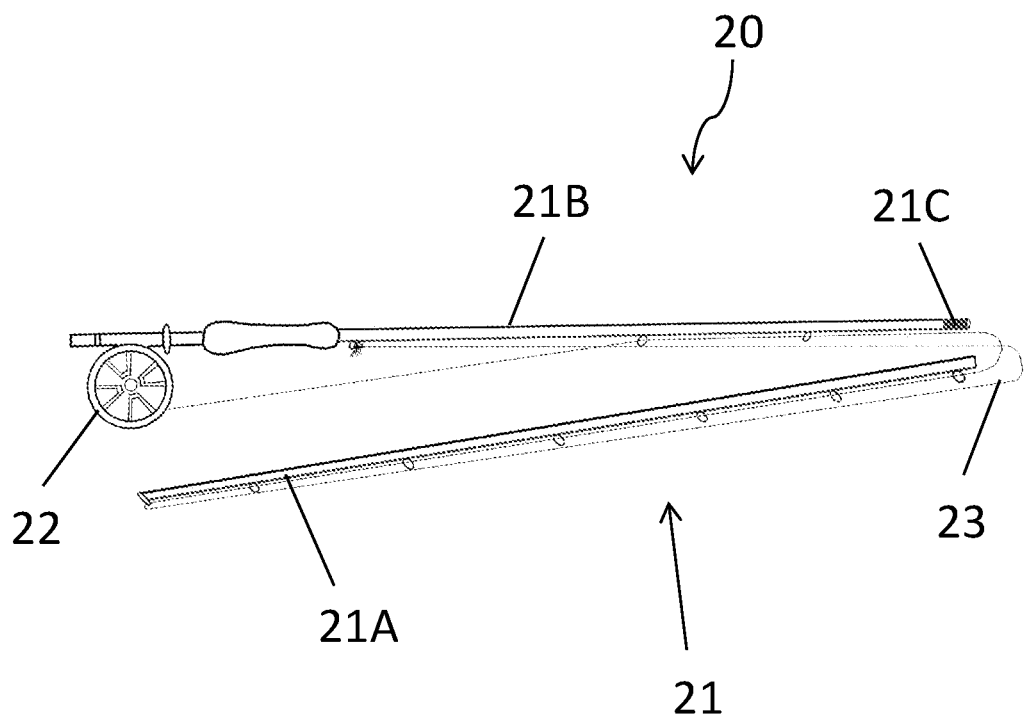
FIG. 10 is a side view of the rigged fly rod of FIG. 9 after being folded for insertion into the fishing rod case of FIG. 1.

Once the distal half 21A of the rigged fishing rod 21 is disengaged from the proximal half 21B at the middle ferrule 21C, the sleeve 1 can then be folded with the contained sections 21A, 21B of the rigged fishing rod 21. Once folded, the distal section 1A of the sleeve 1 is approximately parallel to and resting against the proximal section 1B (FIGS. 2 and 3). The nature of the relatively narrow diameter of the sleeve 1 maintains the fishing line in close proximity to the fishing rod 20, keeping it relatively taught and contained at the bend in the middle section 1C when the sleeve 1 is folded. FIG. 10 illustrates the rigged fly rod 20 with the two rod sections 21A, 21B pulled apart at the ferrule 21C and folded as if the rod 20 has been inserted into the fishing rod case 10 (not shown in FIG. 10).

Referring again to FIGS. 1 and 2, in one embodiment, a flap 4 may be attached to either the distal or proximal sections 1A, 1B of the folding rod sleeve 1, for example about one half the length of the proximal section 1B from the reel housing 5. The flap 4 may be used to secure the distal section 1A with the contained distal half of the fishing rod to the proximal section 1B. The fisherman wraps the fabric flap 4 around the two sections 1A, 1B and secures the flap 4, such as with hook and loop material, a snap, tie, or other like fastener.

Figure 5:
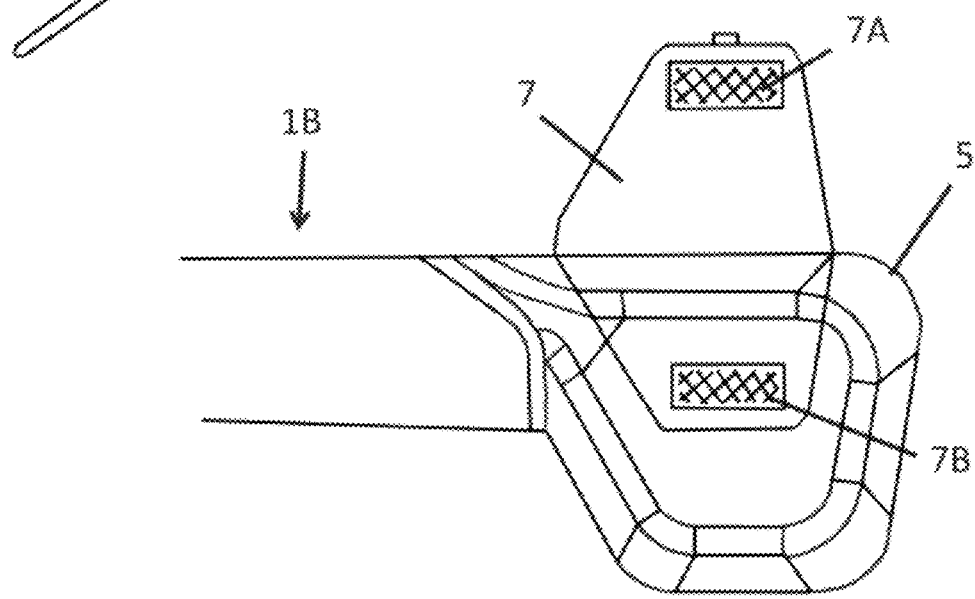
FIG. 5 is a side view of the reel housing of the fishing rod case with the flap in the open position.
Figure 6:
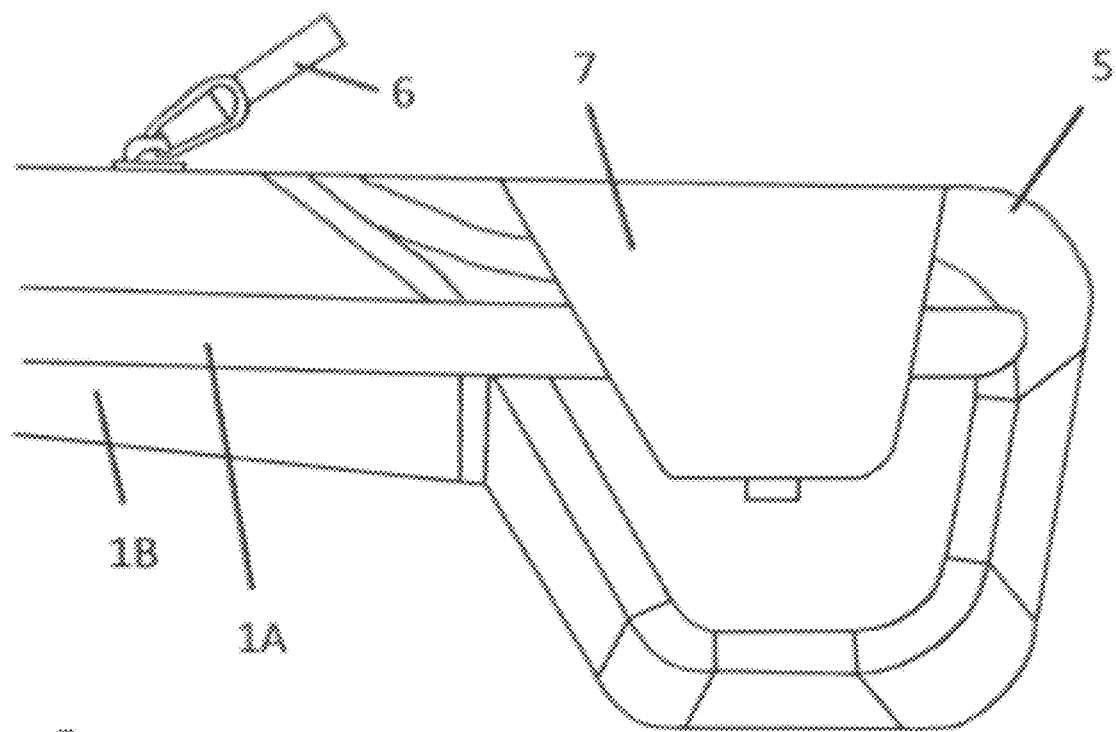
FIG. 6 is a side view of the reel housing with the flap in the closed position.

Referring to FIGS. 5 and 6, a second flap 7 may be attached to the reel housing 5 and folded over an outer surface of the reel housing 5 to secure the tip of the distal section 1A of the sleeve 1 with contained distal half 21A of the fishing rod 21 to the reel housing 5. Referring to FIG. 5, the fisherman lifts the flap 7 and applies it over the tip of the distal section 21A and secures with hook and loop material, snap, tie, or other like fastener 7A and 7B, as illustrated in FIG. 6. The distal section 21A of the rigged fishing rod 20 is now secured to the proximal section 21B contained within the folded fishing rod sleeve 1, ready for convenient transport or storage.

When the fisherman is ready to fish again, he disengages the flaps 4 and 7, unfolds the distal section 1A of the sleeve from the proximal section 1B, and straightens it back out to its full length as seen in FIG. 1. He then attends to the middle portion 1C of the sleeve 1 to reengage the middle sections 21A, 21B of the fishing rod 21 by firmly pressing the male portion of the rod 21 into the ferrule 21C. This action can be aided by the grip material 3 or by accessing the rod sections 21A, 21B through the middle zipper 2 if needed.

Figure 8:
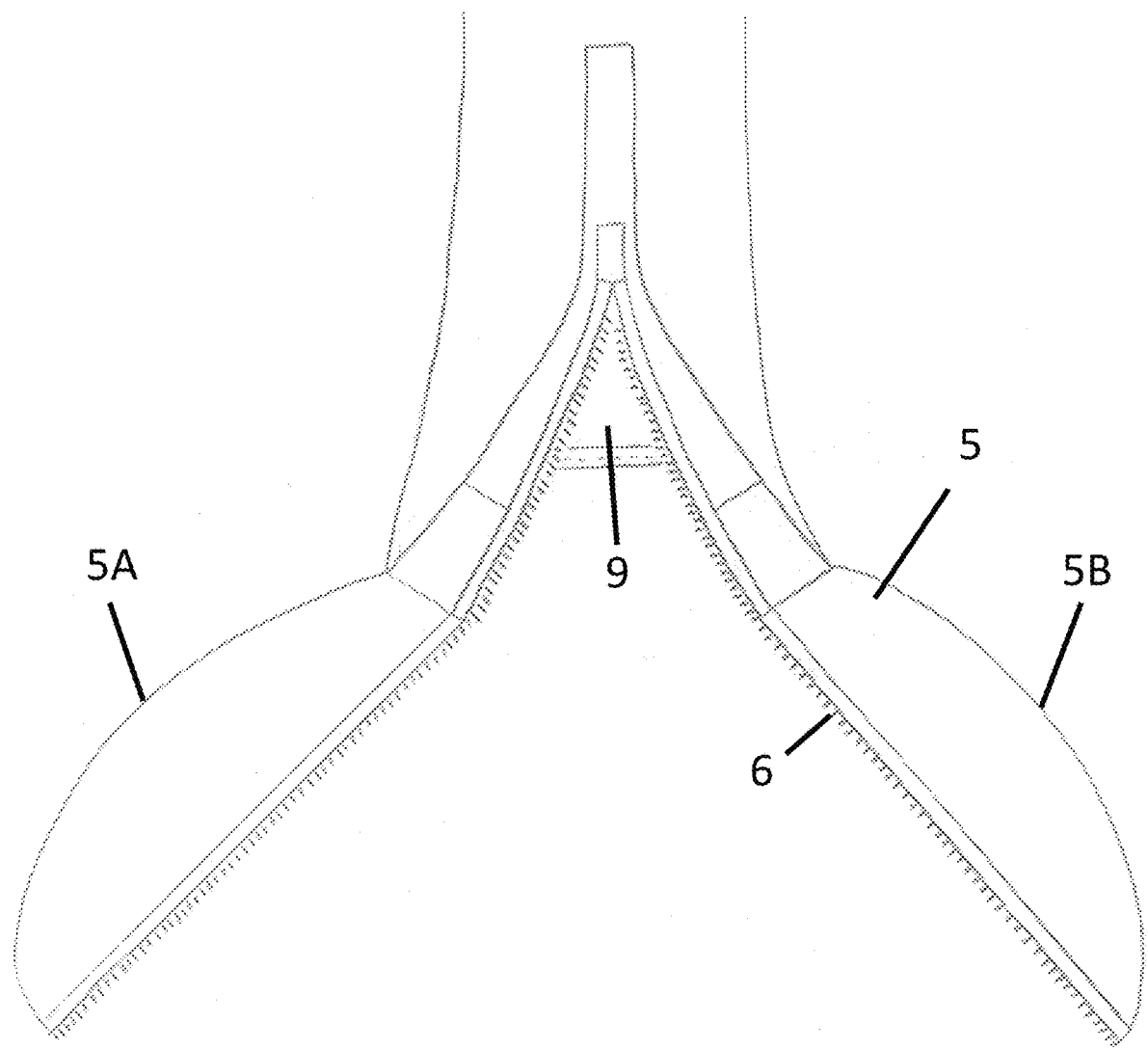
FIG. 8 is a top view of the reel housing in the open position.

In one embodiment (FIG. 8), a gusset 9 is attached between the two sides 5A, 5B of the reel housing 5, near the opening to the proximal section 1B. Once the middle sections 21A, 21B of the fishing rod 21 are reconnected, the fisherman unzips the reel housing 5 and separates both halves of the case 5A and 5B, making the gusset 9 taut. The fisherman then tilts the rod tip downward allowing the top of the rod 21 to slide along the gusset 9. The gusset 9 prevents the rod 21 and guides from catching on the reel housing 5 and zipper 2A during removal.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Thus, numerous variations and other embodiments of the invention are contemplated. For instance, in other embodiments of the invention, the reel housing is made of fabric, plastic or other suitable material. In other embodiments, the fabric sleeve is lengthened or shortened to accommodate the varied lengths of fishing rods, and the reel housing is comprised of different shapes and configurations to accommodate different reel types, proximal rod butts or additional handles as in the case of two handed spey rods and conventional bait casting poles. In other embodiments, the fabric flaps used to secure the distal half of the sleeve to the proximal half are replaced with clasps, hooks, magnets or other means of securing the two halves of the sleeve to each other. In other embodiments of the invention, the device is comprised of the sleeve having the characteristics described herein, but the reel housing is absent. Other variations considered are sleeves that fold a rigged fishing rod twice into ⅓ the full length for three-piece rods or three times into ¼ the full length for four-piece rods. Other embodiments contemplated include a sleeve made of rigid or semi-rigid material, such as plastic or foam, with a fabric material or hinge at the folding point(s).

I claim:

1. A foldable fishing rod sleeve comprising:
a sleeve into which a rigged fishing rod is insertable, the sleeve comprising:
a distal section;
a proximal section having an open proximal end; and
a flexible middle section connecting a proximal end of the distal section with a distal end of the proximal section, whereby the distal section is foldable at the middle section onto the proximal section;
a closable slot along at least a portion of the middle section; and
means for closing the slot;
at least one strap connected to one of the distal or proximal sections configured to hold the distal and proximal sections parallel to each other when the sleeve is folded at the flexible middle section;

a reel housing connected to a proximal end of the proximal section of the sleeve, the reel housing comprising first and second opposing sides and means for securing the first and second side to each other;

a flap foldable over an outer surface of the reel housing; and means for securing the flap to the outer surface of the reel housing;

whereby the distal end of the distal section is retained between the flap and the outer surface of the reel housing.

2. The foldable fishing rod sleeve of claim 1, wherein the proximal and distal sections comprise a flexible material.

3. The foldable fishing rod sleeve of claim 1, wherein the proximal and distal sections comprise a rigid-material.

4. The foldable fishing rod sleeve of claim 1, further comprising grip material along at least a portion of an inside surface of the middle section.

\* \* \* \* \*